United States Patent [19]

Aoki et al.

[11] Patent Number: 4,734,762
[45] Date of Patent: Mar. 29, 1988

[54] COLOR IMAGE READING APPARATUS WITH A PLURALITY OF LINE SENSORS IN WHICH A WHITE BALANCE OPERATION IS PERFORMED BY DETERMINING AMPLIFIER GAINS WHILE READING A WHITE REFERENCE PLATE

[75] Inventors: Takao Aoki, Abiko; Mitsuhiro Tokuhara, Chigasaki; Yoshinori Ikeda, Matsudo, all of Japan

[73] Assignee: Canon Kabushiki Kaisha, Tokyo, Japan

[21] Appl. No.: 61,042

[22] Filed: Jun. 12, 1987

Related U.S. Application Data

[63] Continuation of Ser. No. 543,237, Oct. 18, 1983, abandoned.

[30] Foreign Application Priority Data

Oct. 20, 1982 [JP] Japan ................ 57-183864

[51] Int. Cl.⁴ .................. G03F 3/08; H04N 1/46; H04N 9/73
[52] U.S. Cl. ...................... 358/80; 358/29; 358/75
[58] Field of Search .......... 358/29, 75, 163, 80, 358/29 C

[56] References Cited

U.S. PATENT DOCUMENTS

| | | | |
|---|---|---|---|
| 4,136,360 | 1/1979 | Hoffrichter et al. | 358/80 |
| 4,233,612 | 11/1980 | Hirayama et al. | 346/160 |
| 4,358,794 | 11/1982 | Kurakami et al. | 358/293 |
| 4,368,482 | 1/1983 | Machida et al. | 358/29 |
| 4,454,532 | 6/1984 | Itani et al. | 358/29 |
| 4,633,301 | 12/1986 | Saitoh | 358/29 C |
| 4,633,314 | 12/1986 | Kurata et al. | 358/163 |
| 4,679,073 | 7/1987 | Hayashi | 358/29 C |

FOREIGN PATENT DOCUMENTS

| | | | |
|---|---|---|---|
| 79567 | 6/1980 | Japan | 358/163 |
| 58370 | 5/1981 | Japan | 358/75 |

Primary Examiner—James J. Groody
Assistant Examiner—Randall S. Svihla
Attorney, Agent, or Firm—Fitzpatrick, Cella, Harper & Scinto

[57] ABSTRACT

A color image reading apparatus with a plurality of line sensors and an associated plurality of rotary color filter disks produces a plurality of sequential color component signals from each line sensor. An amplifier with an adjustable gain is provided for each of the line sensors. A white balance operation is performed prior to reading a color document by determining gains for each of the amplifiers to use in amplifying corresponding ones of the sequential color component signals on the basis of a plurality of reference color component signals generated by reading a white reference plate with the line sensors. The determined gains are stored in a memory as digital data. The data is read out and used to control the gains of the amplifiers while a color document is being read. Color balance correction switch units enable an operator to selectively modify the determined gains in order to adjust the color balance of the color component signals.

11 Claims, 9 Drawing Figures

COLOR IMAGE READING APPARATUS WITH A PLURALITY OF LINE SENSORS IN WHICH A WHITE BALANCE OPERATION IS PERFORMED BY DETERMINING AMPLIFIER GAINS WHILE READING A WHITE REFERENCE PLATE

This application is a continuation of application Ser. No. 543,237 filed 10/18/83, now abandoned.

BACKGROUND OF THE INVENTION

1. Field of the Invention

The present invention relates to an image reading apparatus for photoelectrically reading a image of an original or the like.

2. Description of the Prior Art

In a conventional image pickup device, especially an image reading apparatus using a solid state image pickup element such as a charge coupled device or element (to be referred to as a CCD hereinafter), light is irradiated on a surface of an original, and light reflected by the surface is received by the solid state image pickup device. The information received by the image pickup device is electronically scanned along the main scanning direction and by moving a scanning unit with the device along a subscanning direction perpendicular to the main scanning direction. For example, in order to read an original of A3 size with this apparatus under the conditions that the read line density is given as 16 lines/mm and the resolution along the main scanning line is 16 pels/mm, the number of output bits along one main scanning line is 4,752 bits, and the number of main scanning lines is 6,720. However, the number of bits of a commercially available CCD is 2,048. In order to obtain the above number of output bits, three CCDs must be aligned along the main scanning direction. For example, as shown in FIG. 1, an original 4 on an original table 3 is read by a combination of three CCDs 1a to 1c and three photographing lenses 2a to 2c. Each CCD and a corresponding photographing lens can read one-third of the original 4. Reference symbol X denotes a main scanning direction; and Y, a subscanning direction. Reference numeral 12 denotes an image density reference portion to be described later.

In the conventional image reading apparatus using a plurality of image pickup devices (i.e., CCDs), the following problem occurs. A level of an output signal from a circuit coupled to the plurality of CCDs varies in accordance with variations in both CCD sensitivity and in a transmission factor of a near-infrared cut filter. When the output from the reading apparatus is supplied to an output device such as a laser beam printer or an ink jet printer so as to reproduce the image, the image or background densities of portions corresponding to respective CCDs tend to vary.

In an apparatus which allows reading of a color image, color balance is disturbed in the reproduced image due to variations in the transmission factor of a color separation filter, thereby resulting in a poor image. In particular, in a color image reading apparatus having a plurality of image pickup devices (e.g., CCDs), color balance of the color image is disturbed even when a level of an output signal from a circuit coupled to the image pickup devices changes only slightly, thereby degrading the image quality of the reproduced image.

Variations in CCD sensitivity include sensitivity variations due to similar changes in general spectral sensitivity characteristics of the CCD as indicated by the solid line in FIG. 2. In addition to these, further CCD sensitivity variations are caused when spectral sensitivity factors of spectra excluding blue, green, red and near-infrared spectra change relatively. This mostly results in a color balance disturbance in the color image reading apparatus. In addition to these disadvantages, variations in CCD sensitivity over time is also a critical problem.

The near-infrared cut filter has a transmission factor indicated by the dotted line in FIG. 2. This filter serves as a sensitivity/color correction filter for white exposure and as a color separation filter for improving the color separation by limiting near-infrared transmission of the color separation filter with respect to the CCD. A multi-coating interference filter or a glass filter is used as the near-infrared cut filter. However, both multi-coating filters and glass filters have variations in near-infrared ray wavelengths and transmission factors of visible rays. Similarly, a tricolor (blue, green and red) separation filter has variations in sharp cut wavelengths and transmission factors of the blue, green and red rays. Therefore, the image quality of the reproduced color image is adversely affected by the variations of the filters in addition to the variations in CCD sensitivity factors. Furthermore, variations in electrical characteristics of an amplifier connected to each CCD cannot be neglected as another factor which degrades the quality of the reproduced image.

SUMMARY OF THE INVENTION

The present invention has been made in consideration of the factors described above, and has for one of its objects to provide an image reading apparatus wherein the above drawbacks of the conventional image reading apparatus can be eliminated, and good image reading can be performed irrespective of nonuniformity of a light emitting distribution of a light source and variations in spectral sensitivity characteristics of image pickup devices.

It is another object of the present invention to provide an image reading apparatus wherein an output obtained by performing color separation of an image can be corrected to data having good color balance.

It is still another object of the present invention to provide an image reading apparatus wherein outputs among a plurality of reading elements can be corrected to obtain highly precise outputs.

The above and other objects, features and advantages of the present invention will be apparent from the following detailed description taken in conjunction with the accompanying drawings.

DETAILED DESCRIPTION OF THE PREFERRED EMBODIMENTS

An image reading apparatus according to an embodiment of the present invention will be described in detail with reference to FIGS. 3 to 9. A description will be made of the configuration and operation of an optical system, an output device, and a signal processing unit, in the order named.

Pieces of information which can be read by the image reading apparatus of the present invention include information from a document, a photograph, a map and a table which represents an image, a character, a symbol and the like. In addition, pattern information of a flat object such as a fabric material or fabric product is also included in information which can be read by the image reading apparatus. These information carriers are called originals throughout the specification.

Figure 3:
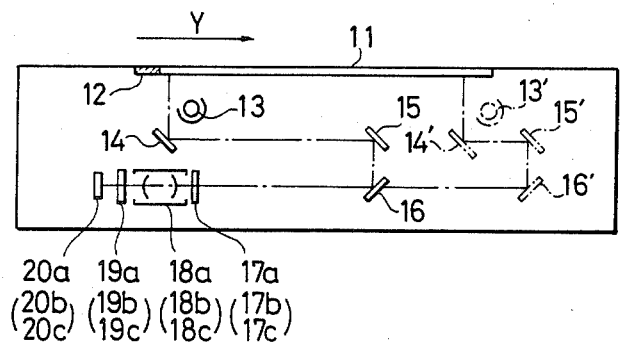
FIG. 3 is a sectional view of an optical system of an image reading apparatus according to the present invention.
Figure 4:
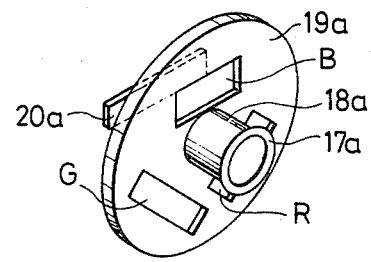
FIG. 4 is a perspective view showing color separation filters and their related elements of an optical system shown in FIG. 3.

Optical System of Image Reading Apparatus (FIGS. 3 and 4)

Figure 1:
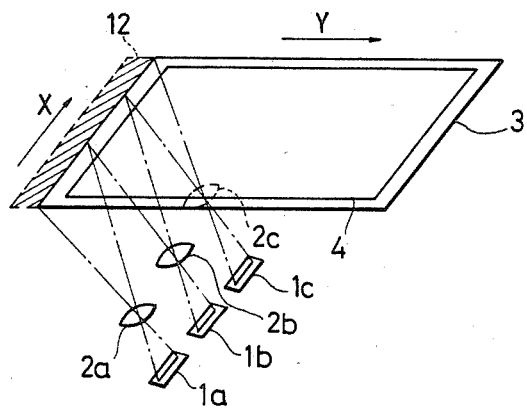
FIG. 1 is a representation showing the schematic configuration of an image reading apparatus having a plurality of image pickup devices.
Figure 2:
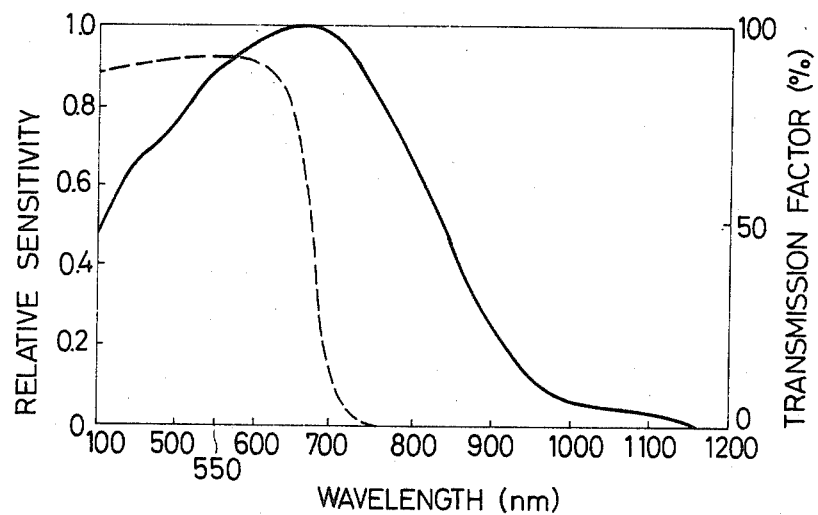
FIG. 2 is a graph showing the relationship between the spectral sensitivity characteristics of a CCD and the transmission factor of a near-infrared cut filter.

FIGS. 3 to 9 show the detailed configuration and operation of a color image reading apparatus having a plurality of CCDs. Referring to FIG. 3, an original table glass plate 11 is disposed as an upper surface portion of the color image reading apparatus so as to be aligned with the remaining upper surface portion thereof. An image density reference portion 12 is disposed at an end of the original table which corresponds to an end of the original. The reference portion 12 comprises a white standard reflecting plate having a uniform density. A light source 13 irradiates the original and comprises, for example, a halogen lamp. Reflecting mirrors 14 to 16 reflect light reflected from the original. Near-infrared cut filters 17a to 17c are disposed in front of photographing lenses 18a to 18c, respectively. Tricolor separation filters 19a to 19c (FIG. 4) each having blue, green and red filters are disposed behind the photographing lens 18a to 18c. CCDs 20a to 20c are disposed behind the filters 19a to 19c and are aligned along the main scanning direction in the same manner as in FIG. 1. The halogen lamp 13 and the first reflecting mirror 14 constitute a scanning unit, and are supported integrally by a support (not shown). The scanning unit is moved at a predetermined speed along guide rails (not shown) in the Y direction so as to perform subscanning. The second and third reflecting mirrors 15 and 16 are supported integrally by a support (not shown) in the same manner as the subscanning unit. The second and third reflecting mirrors 15 and 16 are moved along guide rails (not shown) in the Y direction. The travel speed of the second and third reflecting mirrors 15 and 16 is set to be half of that of the halogen lamp 13 and the first reflecting mirror 14. Therefore, the halogen lamp 13 and the reflecting mirrors 14 to 16 are moved to positions indicated by reference numerals 13' and 14' to 16' at the end of scanning. However, the optical paths to the photographing lenses 18a to 18c with respect to every scanning point on the original are kept constant. The scanning unit returns to the position indicated by the solid line when orignal exposure is completed. The light source is moved relative to the original. However, an apparatus having a fixed light source and movable original table can be used in place of the apparatus having a movable light source and the fixed original table, as shown in FIG. 3.

FIG. 4 is a perspective view showing the arrangement of a set of element of an optical system which has the near-infrared cut filter 17a, the photographing lens 18a, and the tricolor filter 19a having blue, green and red filter elements mounted on a rotary disk, and the CCD 20a. In the state shown in FIG. 4, the blue filter element is at the exposure position. The filters 19 are rotated about their shaft by a power source (not shown). The positions of the B, G and R filter elements are detected by a sensor (not shown), and color discrimination signals are transferred to signal lines C1 and C2 (FIG. 6) through an encoder.

The operation of the optical system shown in FIGS. 3 and 4 will now be described. An original placed on the original glass plate 11 is exposed by the halogen lamp 13 three times so as to correspond to the three colors (blue, green and red) of the color separation filters 19a to 19c. Light rays from the image in each exposure are focused on the CCDs 20a to 20c through the near-infrared cut filters 17a to 17c, the photographing lenses 18a to 18c, and the color separation filters 19a to 19c, respectively. The main scanning directions of the CCDs 20a to 20c are perpendicular to the plane of FIG. 3. Each CCD 20a, 20b or 20c performs one-third of the entire scanning (i.e., 4,752 bits) along the main scanning direction. The three series of image signals from the CCDs 20a to 20c are converted by the signal processing unit to be described below (FIG. 6) to one series of image signals which corresponds to one main scanning line.

Prior to scanning of the original in the apparatus shown in FIG. 3, the halogen lamp 13 irradiates the white standard reflecting plate 12, and reflected light beams are focused on the CCDs 20a to 20c in the same manner as during scanning of the original. The focused light beams are used as reference signals in the signal processing unit shown in FIG. 6. The white standard reflecting plate 12 may be mounted on an original cover for pressing the original toward the original table glass plate 11. Alternatively, the white standard reflecting plate 12 may comprise a member extending from side to side of the original along the X direction at either the front or rear end. Equally, a plate having blue, green and red spectral components may be used in the original reading area corresponding to the three CCDs. A member for utilizing transmitted light may be used in place of the member for utilizing light reflected from the original.

Figure 5:
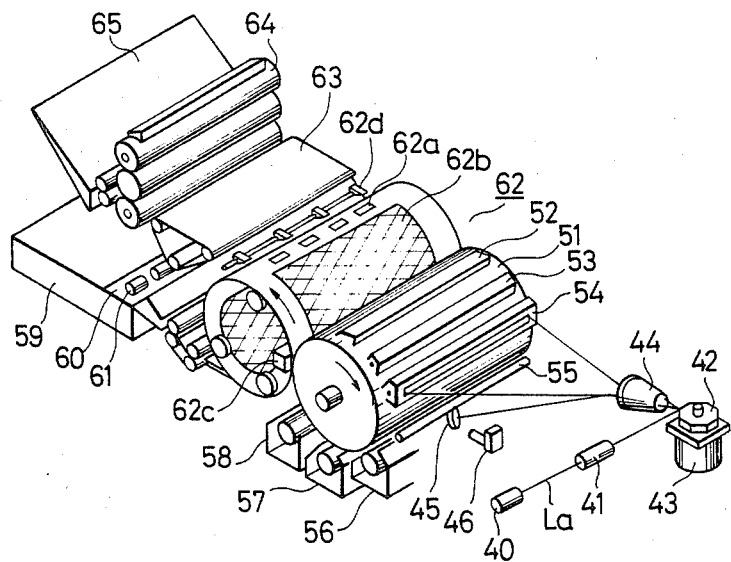
FIG. 5 is a perspective view showing the main part of a laser beam printer as an output device of the image reading apparatus of the present invention.

Image Output Device (FIG. 5)

Figure 6:
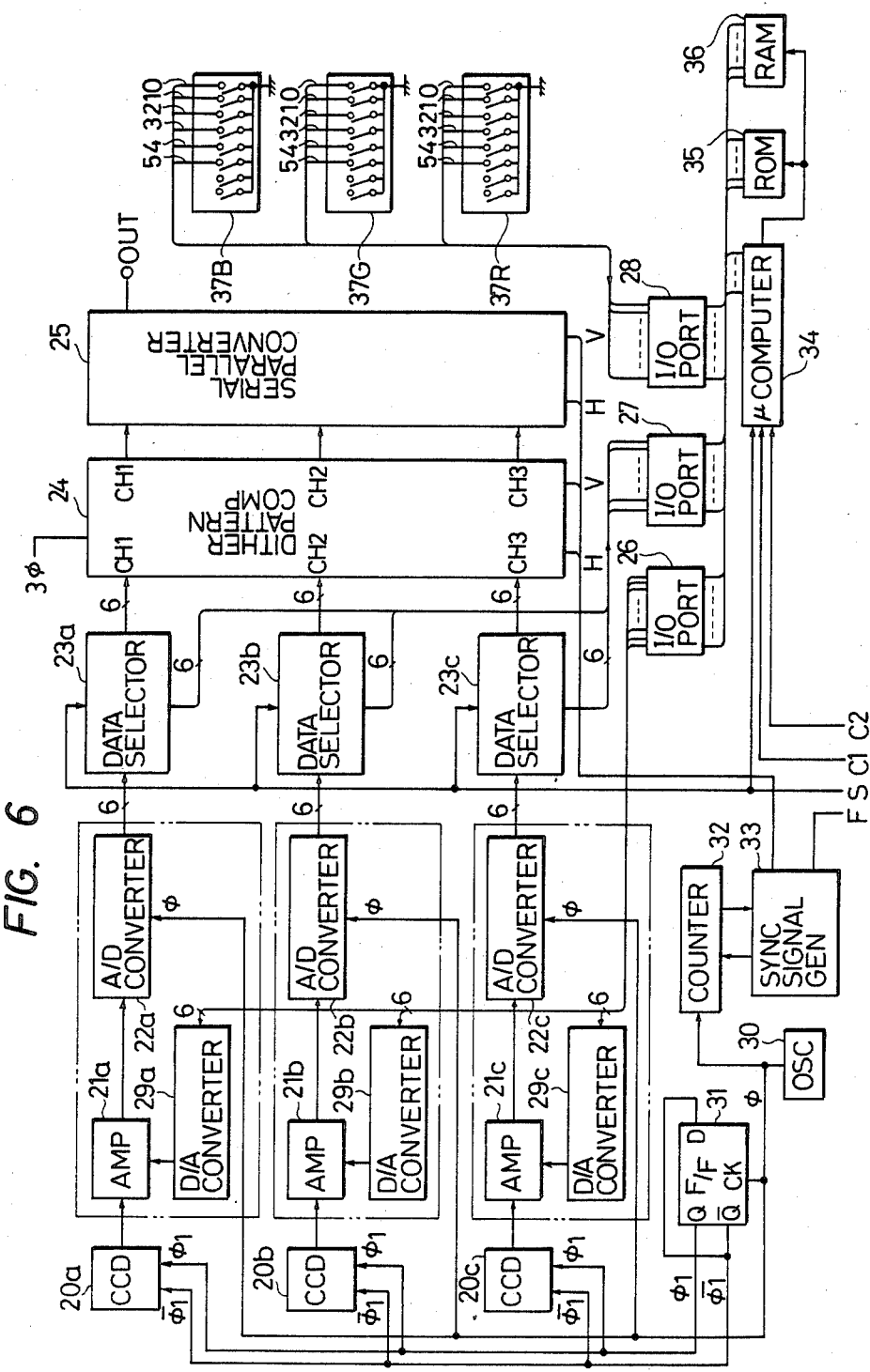
FIG. 6 is a block diagram of a read signal processing unit of the image reading apparatus of the present invention.

FIG. 5 shows a color laser beam printer as an output device for generating data read by the color image reading apparatus of the present invention. Referring to FIG. 5, a semiconductor laser 40 generates a laser beam La. The image signals output from the CCD's 20a to 20c (FIG. 3) are converted to one series of image signals that correspond to one scanning line by the signal processing unit (FIG. 6). The laser beam is modulated by the such image signals. Alternatively, the laser beam La generated by the semiconductor laser 40 can be modulated by a separate modulator in accordance with the signals described above. In either case, the modulated laser beam La is shaped by a beam expander 41 so as to form a beam spot having a predetermined diameter. This beam spot is incident on a polyhedral reflecting mirror 42. The polyhedral reflecting surfaces 42 has a plurality of reflecting surfaces and is rotated by a constant velocity motor 43 at a predetermined speed. Therefore, the incident laser beam La is scanned substantially in the horizontal direction and is focused as a spot beam on a photosensitive drum 51 through a slit for a secondary charger 54 by means of a focusing lens 44 having an f-$\theta$ characteristic. Part of the output laser beam from the focusing lens 44 is reflected by a reflecting mirror 45 and is detected by a beam sensor 46. An output signal from the beam sensor 46 is used to control the modulation timing of the semiconductor laser 40 so as to form a predetermined electrostatic image on the photoelectric drum 51.

The photoelectric drum 51 has a conductive support (i.e., a CdS photoconductive three-layer structure including a photoconductive layer and an insulating layer) and is rotatably supported. The photoelectric drum 51 is cleaned by a cleaning unit 52, and the residual latent image is removed by an AC charger (not shown). When the photoelectric drum 51 is rotated in the direction indicated by the arrow, the surface thereof is uniformly positively charged by a primary charger 53 and is then negatively charged by the secondary charger 52 while being scanned with the laser beam. The surface of the photoelectric drum 51 is then uniformly exposed by a lamp 55, so that an electrostatic latent image is formed thereon. This latent image is developed by a corresponding color developing unit among three developing units 56, 57 and 58 respectively having yellow, magenta and cyan developers.

In the image reading apparatus of the present invention, a latent image formed on the photosensitive drum 51 in accordance with a signal obtained by scanning the original through the blue filter element B is developed by the yellow developer. The latent image obtained by scanning the image through the green filter element G is developed by the magenta developer. The latent image obtained by scanning the image through the red filter element R is developed by the cyan developer.

The charge polarities may be reversed when the conductivity type of the photoconductive body is reversed.

A transfer medium 60 stored in a cassette 59 is fed by a pickup roller 61 in synchronism with rotation of the photoelectric drum 51. A leading end of the transfer medium 60 is held by a gripper 62a of a transfer drum 62 having the same diameter as that of the photoelectric drum 51. The transfer medium 60 is then wound around the surface of a 70 mesh polyester mesh screen 62b which is mounted in a notched position of the cylinder. A transfer charger 62c charges the rear surface of the mesh screen 62b so as to transfer a tricolor image from the photoelectric drum 51 to the transfer medium 60 such that the three color toner images are sequentially overlaid and are transferred to the medium 60. Thereafter, the transfer medium 60 is released from the gripper 62a by means of separation pawls 62d. The transfer medium 60 is guided to a heat roller fixer 64 along a conveyor belt 63. The image is then fixed by the fixer 64, and the transfer medium 60 is discharged to a discharge tray 65. A multi-color image is formed on the transfer medium 60; information of the original can be accurately reproduced in such a color image reading apparatus (FIGS. 3 and 4).

Figure 7:
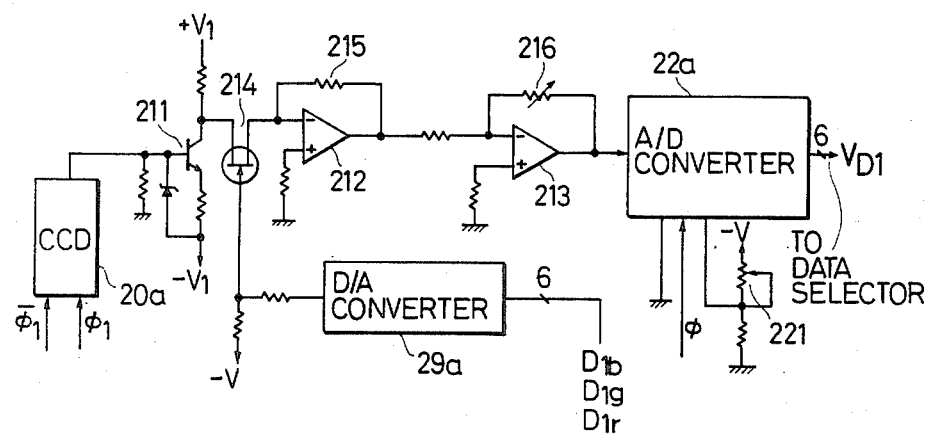
FIG. 7 is a block diagram showing the detailed configuration of an amplifier and related components of the signal processing unit shown in FIG. 6.

Configuration of Read Signal Processing Unit (FIGS. 6 and 7)

FIG. 6 is a block diagram of a read signal processing unit as a main feature of the present invention. FIG. 7 is a block diagram showing the detailed configuration of an amplifier, an A/D converter and a D/A converter of the unit shown in FIG. 6. As shown in FIG. 6, one-channel processing circuits are arranged to correspond to the CCDs 20a to 20c, respectively. In the description below, only the first channel processing circuit whose elements are affixed by a will be represented or mainly described.

An output from the CCD 20a is amplified by an amplifier (AMP) 21a and is converted by an A/D converter 22a to 6-bit digital data (resolution: 64). The 6-bit data is supplied to a data selector 23a. The data selector 23a selectively puts out data signals in response to a switching signal S. The switching signal S is obtained by detecting the position of the scanning unit. The switching signal S goes low while the scanning unit irradiates the image density reference portion (e.g., white standard reflecting plate 12 in FIG. 3). The switching signal S goes high while the scanning unit irradiates the original. When the switching signal S is set at low level, an output signal from the data selector 23a is supplied to an I/O port 27 connected to a microcomputer ($\mu$-computer) 34. However, when the switching signal S is set at high level, the output signal from the data selector 23a is supplied to a dither pattern comparator 24 and is processed as a normal image signal. The gain of the amplifier 21a is controlled in accordance with analog signals converted by a D/A converter 29a from digital data $D_{1b}$, $D_{1g}$ and $D_{1r}$ corresponding to blue, green and red exposure operations. When an input to the A/D converter 22a is smaller than a predetermined value, the gain of the amplifier 21a is controlled to be increased. However, when the input to the A/D converter 22a is larger than the predetermined value, the gain is controlled to be decreased. The above arrangement will be described in detail and constitutes a significant feature of the present invention. Similarly, the gains of the amplifiers 21b and 21c are controlled by analog signals converted by D/A converters 29b and 29c from digital data $D_{2b}$, $D_{2g}$ and $D_{2r}$ and $D_{3b}$, $D_{3g}$ and $D_{3r}$, respectively.

The image signal supplied to the dither pattern comparator 24 is dither-controlled. Six-bit data is supplied as one-bit binary data to a parallel-serial converter 25 through each of channels CH1 to CH3. The parallel-serial converter 25 divides the original into three areas along the main scanning direction and converts parallel image signals read by the CCDs 20a to 20c to a single serial output for each scanning line. The serial data appears at a terminal OUT and is supplied to a subsequent output device. A laser beam printer shown in FIG. 5, a digital video disk or computer disk file can be connected as the output device.

The timing control of the unit shown in FIG. 6 will not be described. In order to transfer charge components as pel data of pels which are obtained by photoelectrically scanning photocells of the CCDs 20a to 20c, a clock signal $\phi$ is generated by an oscillator 30, and a D flip-flop 31 generates clocks $\phi_1$ and $\overline{\phi_1}$ of opposing phases, so that the charge is transferred to the amplifiers 21a to 21c in synchronism with the clock signal $\phi$. The signal from the parallel-series converter 25 is processed in synchronism with a clock $3\phi$ having a duration which is three times the clock $\phi$. An image leading or forward end signal F from an external circuit (not shown) is supplied to a sync signal generator 33 that in response thereto starts a counter 32. The counter 32 counts the number of pels along the main scanning direction. When the count of the counter 32 has reached a predetermined number of pels, the sync signal generator 33 generates a horizontal sync signal H. The counter 32 further counts the number of lines along the subscanning direction. When the count of the counter 32 has reached a predetermined number of lines (6,720 lines), the sync signal generator 33 generates a vertical sync signal V. These sync signals H and V are used to control timings of the dither pattern comparator 24 and the parallel-serial converter 25. The color discrimination signals generated by detecting the positions of the color separation filter elements B, G and R of the tricolor filters 19a to 19c are supplied through the signal lines C1 and C2. The relationship between the signals on the signal lines C1 and C2 and colors to be discriminated is given as follows:

| C1 | C2 | Color |
|----|----|----|
| 0  | 0  | blue |
| 0  | 1  | green |
| 1  | 0  | red |

Figure 9:
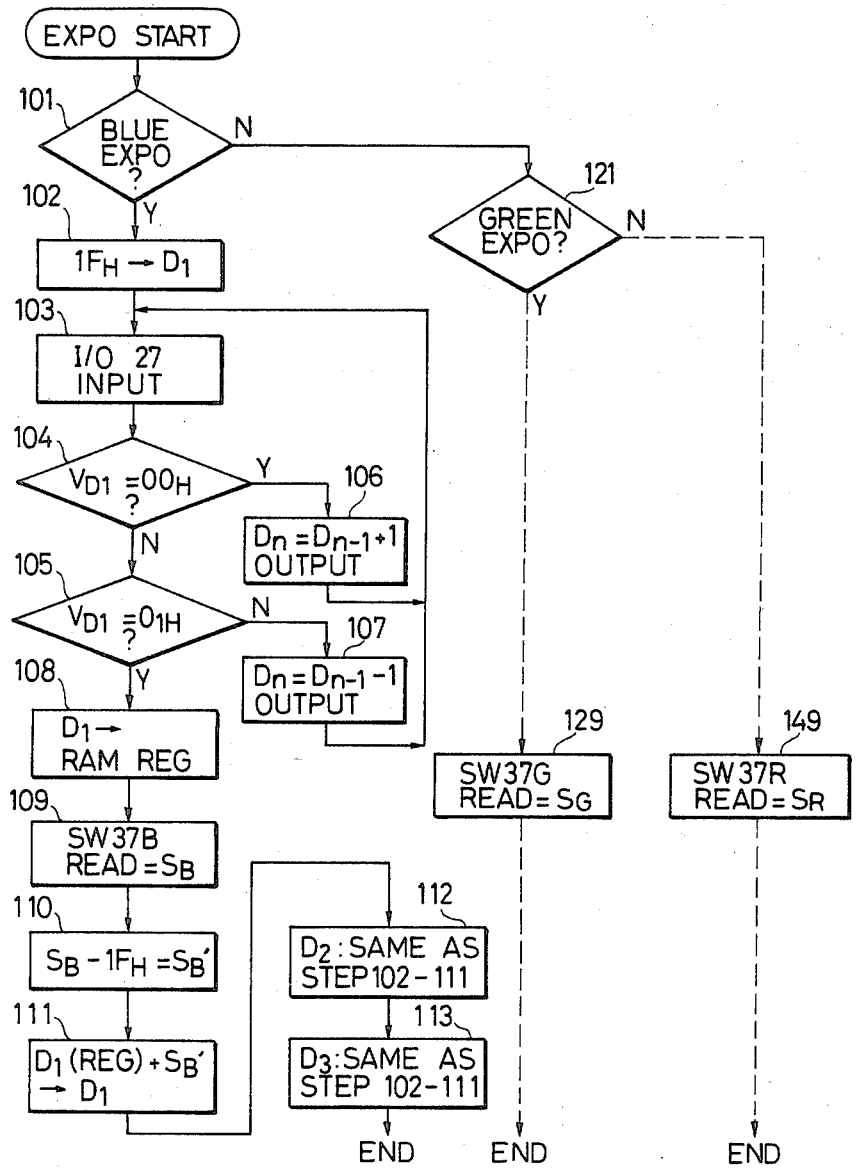
FIG. 9 is a flow chart for explaining the operation of the signal processing unit shown in FIG. 6.

The signals transferred through the signal lines C1 and C2 are supplied as exposure data to the microcomputer 34 so that the microcomputer 34 can determine which color filter is current being used. A read-only memory (ROM) 35 in FIG. 6 stores a program the flow chart for which is shown in FIG. 9. A random access memory (RAM) 36 stores channel data (i.e., $D_{1b}$ to $D_{3b}$) for each exposure which are supplied to the D/A converters 29a to 29c. Switch units 37B to 37R are used to perform color balance correction for each exposure. A color balance signal which is set by the switch unit 37B to 37R is transferred to the microcomputer 34 through an I/O port 28.

FIG. 7 is a detailed block diagram showing the amplifier 21a, the A/D converter 22a and the D/A converter 29a of the first channel of the read signal processing unit shown in FIG. 6. Amplifiers 21b and 21c and the like of the second and third channels of the read signal processing unit have the same arrangement as shown in FIG. 7. The output signal from the CCD 20a is amplified by a discrete amplifier 211, and an inverting amplifier comprising amplifiers 212 and 213. An amplified signal is supplied to the A/D converter 22a. The digital signals $D_{1b}$, $D_{1g}$ and $D_{1r}$ from the I/O port 26 are converted by the D/A converter 29a to analog signals. These analog signals are supplied to an FET (field effect transistor) 214. A resistor 215 connected to the input and output terminals of the amplifier 212 and the FET 214 constitutes a voltage dividing resistor. When the output from the D/A converter 29a is increased (decreased), the ON resistance of the FET 214 is decreased (increased), thereby increasing (decreasing) the gain of the amplifier 212. A variable resistor 216 controls the gain of the amplifier 213. A variable resistor 221 controls the reference value of the A/D converter 22a.

Operation of Read Signal Processing Unit (FIGS. 6 to 9)

The read signal processing unit shown in FIG. 6 is started by the image forward end signal F generated from the external circuit as described above. When the counter 32 counts the predetermined number of pels along the main scanning direction, the sync signal generator 33 generates the horizontal sync signal H. When the counter 32 counts the predetermined number of scanning lines, the sync signal generator 33 generates the vertical sync signal V. Each pel is processed in units of channels in synchronism with the clock signal $\phi$. The signal from the parallel-serial converter 25 and the subsequent stages is processed in synchronism with the clock $3\phi$. When the positions of the color separation filter elements B, G and R are detected by the sensor, and the position signals are coded by the encoder, these encoded signals are supplied as exposure data to the microcomputer 34 through the signal lines C1 and C2. The encoded signals indicate which color filter element is being used.

Figure 8:
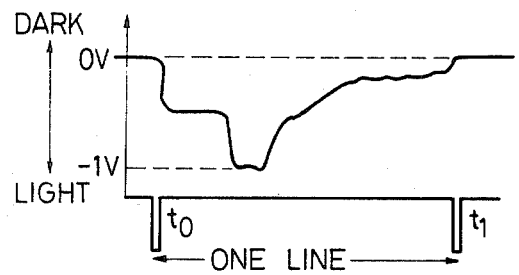
FIG. 8 is a graph for explaining the relationship between an analog signal representing a density level of an original in the image reading apparatus of the present invention and digital data of the read signal corresponding to the analog signal.

In the read signal processing unit, each of the A/D converters 22a to 22c converts an input voltage falling between $-1$ V and 0 V to a data range falling between $00_H$ (where H indicates hexadecimal notation) and $3F_H$ in accordance with 6-bit, 64-resolution conversion. The image signal for one line is preferably set at 0 V for the black level of the original, and at $-1$ V for the white level thereof, as shown in FIG. 8. Reference symbols $t_0$ and $t_1$ in FIG. 8 denote horizontal sync signals for each line. According to the basic principle of A/D conversion described above, an analog input voltage ($-1$ V to 0 V) is converted to a digital signal ($00_H$ to $3F_H$). In practice, the following technique is utilized. The gain of the amplifier 213 of the amplifier 21a (and of corresponding amplifiers of the amplifiers 21b and 21c) is controlled by the variable resistors 216 and 221 such that an image signal of 0 V supplied to the A/D converter is converted to digital data $3E_H$ when black level is detected by the CCDs and an image signal of $-1$ V supplied to the A/D converter is converted to digital data $01_H$ when a white level is detected by the CCDs.

The white and black levels are set at $01_H$ and $3E_H$ for the following reason. When the white level corresponds to the digital data $00_H$, it is difficult to determine whether the A/D converter input has reached a predetermined level or a saturation level. Therefore, when the white level corresponds to $01_H$, it can be properly detected whether the A/D converter input has reached the predetermined level. Similarly, the black level is not set at $3F_H$ but at $3E_H$ because it is difficult to determine whether the A/D converter input has reached a predetermined level or zero (0).

The control operation of the read signal processing unit shown in FIG. 6 will be described with reference to the flow chart in FIG. 9. A description will be mainly made for the first channel. A single original is exposed by the halogen lamp 13 (FIG. 3) three times as previously described. The image of the original is subject to color separation by the color filter elements B, G and R during the exposure cycle. The blue, green and red components from the original are photoelectrically converted by the CCD 20a to parallel electric signals. Prior to the first exposure or scanning, the color filter element B is set so that a signal for setting the signal lines C1 and C2 both at logic "0" is supplied to the microcomputer 34 which determines that the blue exposure is to be performed (YES in step 101). When the halogen lamp 13 irradiates the white standard reflecting plate 12 and light reflected by the white standard reflecting plate 12 is incident on the CCDs prior to original exposure, the switching signal S is set at low level, so that the output from the A/D converter 22a is supplied to the microcomputer 34 through the I/O port 27.

The following operation is performed so as to set the image signal read by the white standard reflecting plate 12 at a predetermined value (i.e., the output $V_{D1}$ of the A/D converter 22a is set at the digital data $01_H$). In step 102, digital data $1F_H$ (the middle value of all digital data $00_H$ to $3F_H$) is supplied to the D/A converter 29a through the I/O port 26. At this time, the microcomputer 34 determines whether the 6-bit digital image signal $V_{D1}$ corresponds to digital data $00_H$ or $01_H$. Since the input to the A/D converter 22a is set at a voltage of $-1$ V, the A/D converter output is set to be digital data 01H. Accordingly, the input to the A/D converter 22a is greater than $-1$ V (i.e., the output from the amplifier 21a) when the digital data $V_{D1}$ corresponds to the digital data $00_H$. Therefore, the microcomputer 34 changes the digital data $D_1$ (step 102) to $1F_H+1$ (generally, $D_n=D_{n-1}+1$) so as to cause the input to the A/D converter 22a to come closer to a voltage of $-1$ V. The gain of the amplifier 21a (more particularly, of the amplifier 212 of FIG. 7) is increased. The A/D converter output is supplied again to the microcomputer 34 to perform the same operation as described above (i.e., the sequence of steps 104, 106 and 103 in the order named). However, when the digital data $V_{D1}$ is greater than the digital data $01_H$ in step 105, the microcomputer 34 converts the digital data $D_1$ to $1F_H-1$ (generally $D_n=D_{n-1}-1$) and performs discrimination of the A/D converter output again (the sequence of steps 105, 107, 103, . . . in the order named). As a result, when $V_{D1}=01_H$ is established in step 105, the image signal from the white standard reflecting plate 12 corresponds to the digital data $01_H$. Therefore, the white level corresponds to an analog voltage of $-1$ V (i.e., digitl data of 01H). The black level may be set to correspond to 0 V (digital data of $3E_H$) in similar fashion. A similar control operation is performed for the second and third channels (steps 112 and 113), so that the white to black levels of light reflected from the original for the individual channels, and obtained through the filters 17a to 17c, the photographing lens 18a to 18c, the color separation filters 19a to 19c and the CCDs 20a to 20c, correspond to the digital data of $01_H$ to $3E_H$, respectively, and variations for the individual channels can be corrected irrespective of variations in intermediate systems.

The above control operation is performed prior to original exposure, and the digital signals $D_{1b}$, $D_{1g}$, $D_{1r}$, $D_{2b}$, $D_{2g}$, $D_{2r}$, $D_{3b}$, $D_{3g}$ and $D_{3r}$ of the individual channels which for each exposure are supplied to the D/A converters 29a to 29c are stored in the RAM 36 coupled to the microcomputer 34 (step 108). The corresponding data stored in the RAM 36 are read out prior to the blue, green and red exposures indicated by the color discrimination signals on the signal lines C1 and C2 so as to control the gains of the amplifiers 21a, 21b and 21c. As a result, the image signals for individual color separation exposures from the CCDs can be corrected for variations. In this control system, a color correction signal D for each color exposure may be obtained instead of storing all the digital signals $D_{1b}$ to $D_{3r}$ prior to original exposure, thereby sequentially correcting each subsequent original exposure step.

The preset values from the color balance correction switch units 37B, 37G and 37R are respectively supplied as 6-bit signals to the microcomputer 34 through the I/O port 28 so as to perform the control indicated by steps 108 to 111 of the flow chart of FIG. 9. Correction data representing ±32 resolution levels having the data $1F_H$ as the center can be supplied to the microcomputer (step 109). Instead of supplying the digital signals $D_{1b}$ to $D_{3r}$ supplied to the D/A converters 29a to 29c so as to uniformly control the blue, green and red components, a difference $S'_B$ (step 110) between the value $S_B$ preset by the switch units 37B, 37G and 37R for each color and the data $1F_H$, which is a positive or negative offset value, is added to the digital data $D_1$ (step 111), so that the balance of the image signal of each color separation exposure can be arbitrarily modified. The balance of the image signals of other color separation exposures are also arbitrarily modified, thereby adjusting the color balance of the three color components. From this point of view, when the switch units 37B, 37G and 37R are set at the same value (e.g., $1F_H$), the levels of the image signals for the individual color separation exposures are the same. When the microcomputer 34 determines in step 121 that the green exposure is performed or that the red exposure is performed, the same operation as in the blue exposure can be performed. In this case, the preset value of the switch unit 37G or the switch unit 37R can be fetched in step 129 or 149 in the same manner as in step 109 wherein the preset value $S_B$ of the switch unit 37B is fetched. Therefore, when the green and red exposures are performed, only steps 129 and 149 are illustrated and the related steps are omitted as indicated by broken lines, respectively.

After the level of the white standard reflecting plate 12 is read, and the gains of the amplifiers for the individual colors are determined, original exposure is started. The outputs from the CCDs are corrected by the obtained gains, thereby obtaining the proper outputs. It should be noted that either all the correction values D for the individual colors can be obtained prior to original exposure, or correction values D for each subsequent color exposure can be sequentially obtained.

According to the present invention as described above, the gains of the amplifiers of the individual channels are controlled in accordance with the image signals obtained by irradiating the image density reference portion (white standard reflecting plate 12 of FIG. 3) so as to uniformly correct variations occurring in the plurality of CCDs, lenses and color separation filters. Furthermore, these variations can be controlled by the values preset by the color balance correction switches. As a result, the image signal will not be influenced by variations in the optical systems and the electrical signal processing unit. Sensitivity variations occur due to variations inherent to the CCDs, lenses and filters. In addition, sensitivity variations are also caused by the mounting conditions of these components. However, according to the present invention as described above, automatic sensitivity correction is performed, so that the mounting adjustment of the constituting components can be easily performed. Furthermore, according to the apparatus of the present invention, effective correction can also be performed for degradation of the light source lamp due to long use or a decrease in the amount of light in the optical system due to its contamination, thereby providing a stable, high-quality image.

According to the embodiment of the present invention, changes in color image signal levels which are caused by utilizing a plurality of image pickup devices can be corrected in the same manner as in reading of a monochrome image. Furthermore, changes in levels of color image signals obtained by reading the individual color components of the original can be corrected irrespective of the number of image pickup devices used. In addition to these advantages, even if a plurality of image pickup devices are provided, changes in levels of image signals obtained by reading the image on the original by color separation can be corrected.

The image reading apparatus has the configuration and function as described above. In the image reading apparatus having a plurality of image pickup devices arranged to read divided portions of the image, the levels of the output signals from the plurality of image pickup devices can be controlled to be substantially constant irrespective of variations in sensitivity of the plurality of image pickup devices and variations in near-infrared cut filter characteristics.

In the color image reading apparatus having a plurality of image pickup devices for reading divided portions of the image on the original, the levels of the output signals from the individual color image pickup devices can be controlled for each other component irrespective of variations in color separation filters.

In addition to these advantages, in a color image reading apparatus having a plurality of image pickup devices for reading divided portions of the image on the original by color separation, the levels of output signals from the plurality of image pickup devices can be controlled to be substantially predetermined values for each color component irrespective of variations in sensitivity of the image pickup devices, or variations in characteristics of the near-infrared cut filters or color separation filters.

The mounting and adjustment operations of the constituting components such as the image pickup devices and the filters can, therefore, be easily performed. Furthermore, changes in levels of the output signals from the image pickup devices due to a decrease in the amount of light from the light source can be effectively corrected.

What is claimed is:

1. A color image reading apparatus comprising:
   a plurality of linear sensor means for reading a color document, each of said linear sensor means photoelectrically reading a different portion of a line of the color document in a divided manner and generating a plurality of color component signals representing colors on the color document;
   a plurality of amplifying means each for amplifying said plurality of color component signals generated by a respective one of said plurality of linear sensor means;
   determining means for determining gains for said plurality of amplifying means to use in amplifying corresponding ones of said plurality of color component signals on the basis of a plurality of reference color component signals generated by reading a reference member having a reference density with said plurality of linear sensor means; and
   correcting means for causing each of said plurality of amplifying means to amplify said plurality of color component signals using the respective gains determined by said determining means, thereby correcting the level of each of said plurality of color component signals representing colors on the color document generated by each of said plurality of linear sensor means.

2. An apparatus according to claim 1, further comprising a document table for supporting the color document so as to be read by said plurality of linear sensor means, wherein said reference member is disposed at a position associated with said document table so as to be read by said plurality of linear sensor means.

3. An apparatus according to claim 1, wherein each of said plurality of linear sensor means comprises color separation means for separating color components of the colors on the color document.

4. An apparatus according to claim 1, wherein said correcting means corrects for non-uniformity in the levels of color component signals generated by said plurality of linear sensor means when said plurality of linear sensor means are all generating the same color component signal.

5. An apparatus according to claim 1, wherein said determining means includes storage means for storing information representing the determined gains.

6. An apparatus according to claim 1, wherein each of said plurality of linear sensor means reads the corresponding different portion of a line of the color document by electrical scanning thereof in a main scanning direction, further comprising means for mechanically moving said plurality of linear sensor means relative to the color document in a subscanning direction perpendicular to the main scanning direction, wherein said plurality of linear sensor means reads the entire color document by means of the electrical scanning in the main scanning direction and the relative mechanical movement in the subscanning direction provided by said moving means.

7. An apparatus according to claim 1, further comprising setting means for setting respective desired adjustments to the levels of said plurality of color component signals amplified by said plurality of amplifying means, wherein said determining means modifies the determined gains on the basis of the desired adjustments set by said setting means.

8. An apparatus accoording to claim 1, further comprising means for recording a color image on a recording material on the basis of the plurality of color component signals amplified by said plurality of amplifying means.

9. An apparatus according to claim 1, further comprising means for converting the plurality of color component signals amplified by said plurality of amplifying means to digital color component signals.

10. An apparatus according to claim 1, wherein said determining means causes said plurality of linear sensor means to read the reference member prior to reading the color document in order to determine the gains for said plurality of amplifying means to use in amplifying corresponding ones of said plurality of color component signals.

11. An apparatus according to claim 1, wherein each of said plurality of linear sensor means is operable to read the color document a plural number of times in order to generate said plurality of color component signals.

* * * * *

UNITED STATES PATENT AND TRADEMARK OFFICE
CERTIFICATE OF CORRECTION

PATENT NO. : 4,734,762
DATED : March 29, 1988
INVENTOR(S) : TAKAO AOKI, ET AL.

It is certified that error appears in the above-identified patent and that said Letters Patent is hereby corrected as shown below:

COLUMN 1

Line 14, "a" should read --an--.

COLUMN 4

Line 13, "element" should read --elements--.

COLUMN 5

Line 1, "the such" should read --such--.
    Line 8, "surfaces 42" should read --mirror 42--.
    Line 13, "for" should read --of--.

COLUMN 6

Line 15, "affixed" should read --suffixed--.
    Line 63, "not" should read --now--.

COLUMN 7

Line 36, "current" should read --currently--.
    Line 43, "unit" should read --units--.

COLUMN 9

Line 40, "digitl" should read --digital--.
    Line 41, "01H)." should read --01$_H$).--.
    Line 47, "lens" should read --lenses--.

UNITED STATES PATENT AND TRADEMARK OFFICE
CERTIFICATE OF CORRECTION

PATENT NO. : 4,734,762

DATED : March 29, 1988

INVENTOR(S) : TAKAO AOKI, ET AL.

It is certified that error appears in the above-identified patent and that said Letters Patent is hereby corrected as shown below:

COLUMN 11

Line 24, "other" should read --color--.

COLUMN 12

Line 44, "accoording" should read --according--.

Signed and Sealed this

Thirteenth Day of December, 1988

*Attest:*

DONALD J. QUIGG

*Attesting Officer*   *Commissioner of Patents and Trademarks*